July 28, 1925. 1,547,366
W. G. COX
DOUBLE RAIL BUMPER FOR AUTOMOBILES
Filed Oct. 25, 1923 2 Sheets-Sheet 1

Inventor
W. G. Cox

By Fisher, Moser & Moore
Attorneys

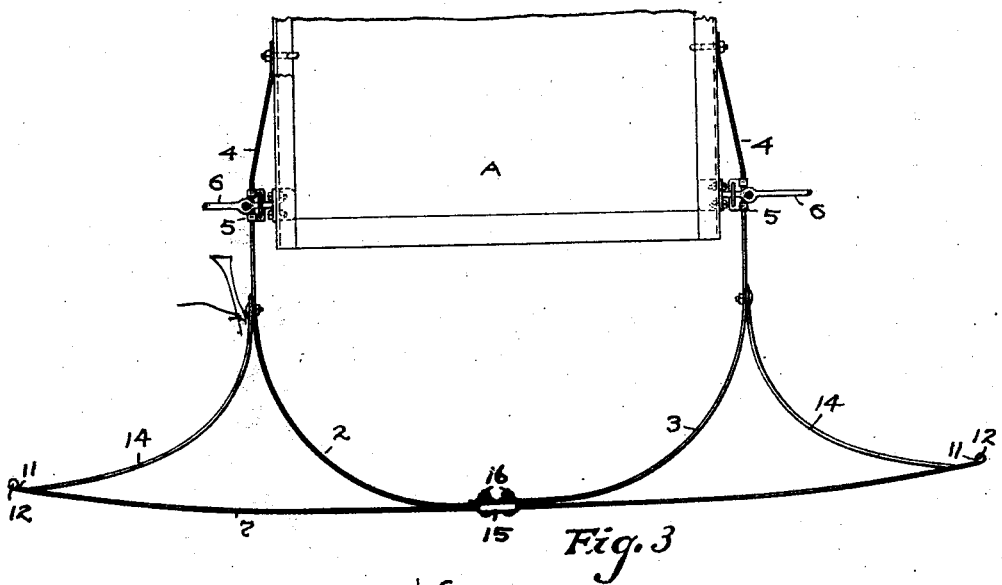
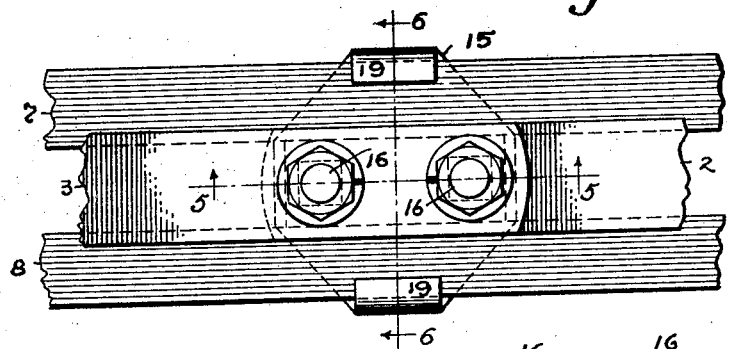
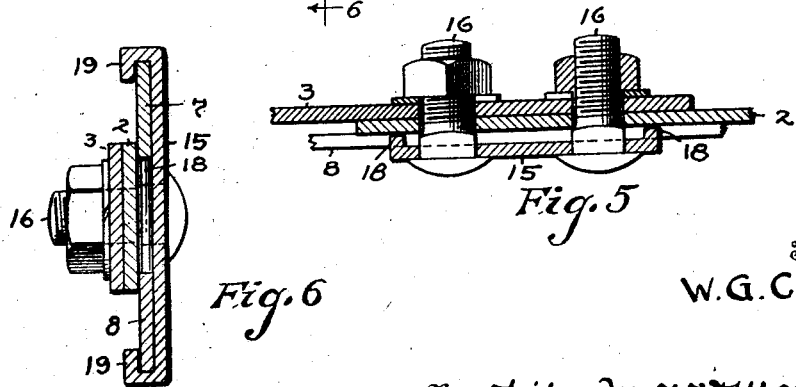

Patented July 28, 1925.

1,547,366

UNITED STATES PATENT OFFICE.

WILLIAM G. COX, OF CLEVELAND, OHIO, ASSIGNOR TO THE EATON AXLE AND SPRING COMPANY, OF CLEVELAND, OHIO, A CORPORATION OF OHIO.

DOUBLE-RAIL BUMPER FOR AUTOMOBILES.

Application filed October 25, 1923. Serial No. 670,764.

*To all whom it may concern:*

Be it known that I, WILLIAM G. COX, a citizen of the United States, residing at Cleveland, in the county of Cuyahoga and State of Ohio, have invented certain new and useful Improvements in a Double-Rail Bumper for Automobiles, of which the following is a specification.

My invention relates to an improvement in a double rail bumper for automobiles, and my general object is to fabricate a bumper in a particular way from separate strips of spring steel so as to produce a bumper of relatively light weight and large impact area capable of withstanding shocks with stout resistance and a given amount of resiliency. More specifically stated my aim is to form a main supporting arch of two strips of bowed spring steel and secure two impact rails in spaced parallel relation to the front meeting ends of said strips, the base or rearwardly-extending portions of said supporting arch being constructed for attachment to the vehicle frame, and the laterally-projecting ends of the parallel impact rails being hinged or pivotally connected to each other and to separate short bracing strips affixed to opposite sides of said main supporting arch. A further object is to provide a clamping device for the two piece supporting arch and the double rails whereby the two arch pieces will be rigidly secured together, and the two rails clamped in spaced relation against the front face of the arch with freedom to shift or move longitudinally in respect to the arch and fastening device whenever a severe blow is imparted to either end of the bumper, and such ends and their hinged rear braces are flexed.

Figure 1:
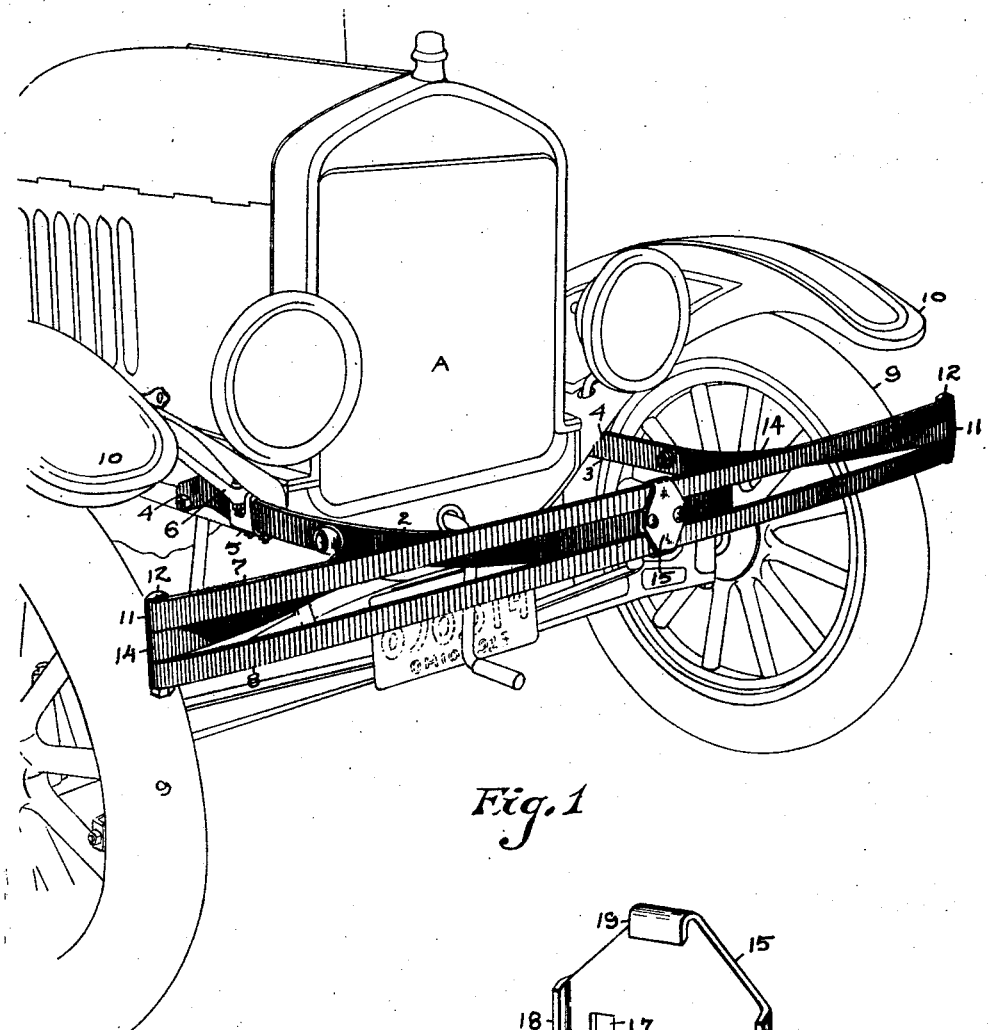
Figure 2:
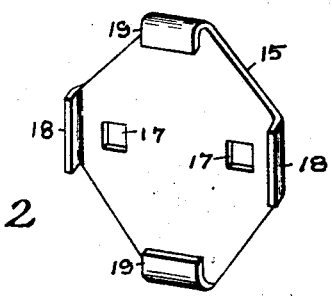

In the accompanying drawing, Fig. 1 is a perspective view of an automobile equipped with my improved double rail bumper. Fig. 2 is a perspective view of the key plate for the bumper. Fig. 3 is a top view of the bumper attached to one end of an automobile. Fig. 4 is an enlarged view of the united portions at the center of the bumper looking forwardly or at the inner side of the bumper. Figs. 5 and 6 are horizontal and vertical cross sections of the union of parts on lines 5—5 and 6—6, respectively, of Fig. 4.

The bumper comprises two flat strips of spring steel 2 and 3 respectively, the front ends of which are bent transversely on sweeping curves toward each other and brought into overlapping relation to provide a two-piece arched support adapted to extend across the end of an automobile A with the base or rearwardly-extending portions 4—4 of each curved strip secured to the outer sides of the chassis frame of the automobile. As shown, the extremity of each strip 2 and 3 is bolted to the frame, and supplemental clamping devices 5 are also used to secure each strip to the fender irons or lamp brackets 6 of the automobile. However, any other suitable means may be used to fasten the base ends of the arched supporting member for the bumper to the frame, which member if stripped of all other fending parts is adapted to function as a bumper and buffer itself because it extends in a protecting position across the end of the vehicle and is directly connected to the frame of the car. To extend the area of protection I mount two flat impact rails of spring steel 7 and 8 in parallel spaced relation at the front of the arched strips 2 and 3, the length of the impact rails being approximately the same or slightly less than the extreme width of the vehicle, thereby bringing the end portions of the rails in front of the wheels 9 and their mud guards or fenders 10. The extremities of the impact rails are rounded or formed into hinge eyes 11 to permit the upper and lower rails to be connected together at their corresponding extremities by means of bolts 12, and the same bolts serve to connect curved spring braces 14 to such extremities within the space between the two rails. The inner ends of braces 14 are bolted to the outer sides of strips 2 and 3 at the base or beginning of their curved portions. Thus, the main support for the bumper is formed by the arched strips 2 and 3, and the curved braces 14 form separate supports for the ends of the two impact rails. The middle portions of the impact rails bear directly against one of the strips forming the main arch, and this is brought about by using flat strips 2 and 3 of relatively greater width than the spacing braces 14, thereby permitting both impact rails to overlap and bear directly against the upper and lower edge portions of the backing strips 2 and 3, see Figs. 4 and 6. This working relationship of parts is maintained by a key plate 15 and a pair of bolts 16; thus the overlapped ends of strips 2 and 3 have registering bolt openings for the bolts 16; and similar registering bolt openings 17 (preferably square to receive the square shanks or necks of the bolts) are formed in plate 15 on its horizontal medial line to permit the bolts to extend through the space between the two impact rails. These two rails are held apart or prevented from springing toward each other by two short lips or flanges 18—18 bent rearwardly at the side edges of the plate opposite the square bolt openings 17, see Figs. 2 and 5, and the upper and lower edges of plate 15 are also bent rearwardly and toward each other to provide short hooks 19—19 adapted to confine the outer edge portions of the two impact rails and thereby prevent them from spreading apart. A tight clamping union may thus be effected between the overlappiang ends of the main supporting strips 2 and 3 and both rails and also key plate 15 but nevertheless when the laterally extending ends of the impact rails are forcibly engaged and flexed both rails may move or shift longitudinally to accommodate any displacement of the rails relatively to the main supporting arch. The hinged connection for the rails with the curved braces also permits an accommodating movement between the parts under flexing stresses, and in the event of a severe collision and distortion of the sections the original form and shape thereof may be readily restored, or new parts may be conveniently substituted because of the sectional separable construction of the bumper as shown and described.

What I regard as my invention, and desire to claim, is:

1. A double rail bumper for an automobile, comprising an arched member made of separate strips of spring steel overlapped at their front ends, a pair of parallel impact rails affixed intermediate their ends to said overlapping ends, and curved brace strips connecting the outer ends of said rails to the sides of the arched member.

2. A double rail bumper for an automobile, comprising separate strips of spring steel curved toward and overlapping each other at their front ends to form an arched support and constructed at their rear ends for attachment to the opposite sides of the automobile frame, a pair of spaced impact rails extending transversely across said overlapping front ends, a plate spanning said rails having flange portions extending into the space between the rails, and means adapted to fasten said plate and rails and overlapping ends together, and braces pivotally connecting the outer ends of said rails with the said arched support.

3. A double rail bumper for an automobile, comprising an arched member formed of separate flat strips of metal overlapped at their outer ends, a pair of spaced rails bearing against said overlapped ends, a plate at the front of said rails having flanged portions extending between said rails and flanged portions overlapping the outer edges thereof, means adapted to bolt said plate and rails and overlapped ends together, and curved braces connected with the outer ends of said rails and bolted to the sides of said arched member.

In testimony whereof I affix my signature.

WILLIAM G. COX.